(12) United States Patent
Hauck

(10) Patent No.: US 11,397,139 B2
(45) Date of Patent: Jul. 26, 2022

(54) METALLOGRAPHIC GRINDER AND COMPONENTS THEREOF

(71) Applicant: Leco Corporation, St. Joseph, MI (US)

(72) Inventor: John Hauck, Bridgman, MI (US)

(73) Assignee: Leco Corporation, St. Joseph, MI (US)

( * ) Notice: Subject to any disclaimer, the term of this patent is extended or adjusted under 35 U.S.C. 154(b) by 915 days.

(21) Appl. No.: 15/893,935

(22) Filed: Feb. 12, 2018

(65) Prior Publication Data

US 2018/0246016 A1 Aug. 30, 2018

Related U.S. Application Data

(60) Provisional application No. 62/463,793, filed on Feb. 27, 2017.

(51) Int. Cl.
| | |
|---|---|
| *B24B 41/06* | (2012.01) |
| *B24B 37/10* | (2012.01) |
| *B24B 37/30* | (2012.01) |
| *B24B 37/32* | (2012.01) |
| *G01N 1/28* | (2006.01) |

(52) U.S. Cl.
CPC ............ *G01N 1/286* (2013.01); *B24B 37/10* (2013.01); *B24B 37/102* (2013.01); *B24B 37/105* (2013.01); *B24B 37/30* (2013.01); *B24B 37/32* (2013.01); *B24B 41/067* (2013.01); *G01N 2001/2866* (2013.01)

(58) Field of Classification Search
CPC ....... B24B 41/06; B24B 41/067; B24B 37/10; B24B 37/102; B24B 37/105; B24B 37/16; B24B 37/26; B24B 37/30; B24B 37/32

USPC .......... 451/41, 285, 287, 288, 397, 398, 527
See application file for complete search history.

(56) References Cited

U.S. PATENT DOCUMENTS

| | | | |
|---|---|---|---|
| 4,534,536 A | 8/1985 | Nelson et al. | |
| 4,579,313 A | 4/1986 | Adani et al. | |
| 4,895,033 A | 1/1990 | Voss et al. | |
| 5,361,545 A | 11/1994 | Nakamura | |
| 5,735,992 A | 4/1998 | Miragaya | |
| 5,738,574 A * | 4/1998 | Tolles | B08B 1/007 451/288 |
| 5,743,788 A * | 4/1998 | Vanell | B24B 37/04 451/41 |
| 5,800,254 A | 9/1998 | Motley et al. | |
| 6,102,777 A * | 8/2000 | Duescher | B24B 37/04 451/262 |
| 6,110,025 A * | 8/2000 | Williams | B24B 49/16 451/286 |
| 6,120,352 A * | 9/2000 | Duescher | B24B 37/042 451/287 |
| 6,149,506 A * | 11/2000 | Duescher | B24B 1/00 451/178 |
| 6,612,914 B2 | 9/2003 | Gurusamy et al. | |

(Continued)

FOREIGN PATENT DOCUMENTS

WO 2009155137 A2 12/2009

*Primary Examiner* — Eileen P Morgan
(74) *Attorney, Agent, or Firm* — Price Heneveld LLP

(57) ABSTRACT

A platen for a metallographic grinder has an outer peripheral rim with an upper surface having a lower height. Also, fingers engaging a specimen are allowed to move laterally (i.e., wobble) to minimize the tipping forces on the specimen during the grinding process. Either one or both of these structures can be employed and results in a much flatter specimen surface for use in subsequent analysis.

19 Claims, 17 Drawing Sheets

(56) References Cited

U.S. PATENT DOCUMENTS

| | | |
|---|---|---|
| 7,404,707 B2 | 7/2008 | Warren et al. |
| 8,758,088 B2 | 6/2014 | Duescher |
| 9,496,099 B2 | 11/2016 | McMahon et al. |
| 2005/0048880 A1* | 3/2005 | Tolles ............... B08B 1/007 451/66 |
| 2008/0064302 A1* | 3/2008 | Fujitani ............ B24B 37/26 451/41 |
| 2008/0119118 A1* | 5/2008 | Zuniga ............. B24B 37/32 451/285 |
| 2009/0209185 A1* | 8/2009 | Motonari ........... B24B 37/26 451/527 |
| 2011/0130003 A1* | 6/2011 | Eisenstock ........ B24B 37/20 438/692 |
| 2014/0206261 A1* | 7/2014 | Roettger ........... H01L 21/304 451/41 |
| 2015/0260624 A1 | 9/2015 | McMahon et al. |

\* cited by examiner

METALLOGRAPHIC GRINDER AND COMPONENTS THEREOF

CROSS-REFERENCE TO RELATED APPLICATIONS

This application claims priority under 35 U.S.C. § 119(e) and the benefit of U.S. Provisional Application No. 62/463,793 entitled METALLOGRAPHIC GRINDER/POLISHER, filed on Feb. 27, 2017, by John Hauck, the entire disclosure of which is incorporated herein by reference.

BACKGROUND OF THE INVENTION

The present invention relates to a metallographic specimen preparation apparatus, namely, components of a grinder for preparing a specimen for subsequent analysis.

Grinders have been used in metallographic preparation for many years. Typically, the machines include a rotating platen to which an abrasive pad is attached. A rotating head is positioned above the abrasive pad with a holder for positioning and holding specimens on the abrasive pad. In some units, a specimen driver extends downwardly and may include fingers aligned with and positioned above the specimens, which are positioned in a specimen holder to apply pressure to the specimens against the platen as the platen rotates. The specimen driver may rotate the specimen holder in either the same or a direction opposite the platen.

Prior art metallographic grinders have employed flat platens and rigid fingers to support the metallographic specimens being finished. The resultant specimens, once polished to a flatness of about 0.002 inch to about 0.004 inch, are analyzed utilizing microscopy, micro hardness testers, or other instruments to determine physical characteristics of specimens which are of interest. With such prior art machines, the flatness of the specimen has proven somewhat inadequate.

There exists a need, therefore, for an improved grinder which will provide a much flatter surface to a specimen for subsequent examination and analysis.

SUMMARY OF THE INVENTION

The present invention satisfies this need by providing a platen for use with a metallographic grinder which improves the flatness of a specimen during grinding. Instead of being flat, the platen has an outer peripheral rim which has a surface-oriented height reduction. When a central force specimen holder is employed, the various platen geometries provide a vastly improved flatness of the specimen. When an individual force specimen holder is employed, flexible fingers are provided for holding a specimen against an abrasive disk on the platen. The fingers are allowed to move laterally (i.e., wobble) to minimize the tipping forces on the specimen during the grinding process. Either one or both of these improvements results in a much flatter specimen surface for use in subsequent analysis. A platen with a surface-oriented height reduction at the outer edge can be used with either an individual force specimen holder in which the specimens are held down with fingers, or with a central force specimen holder in which the specimens are clamped into place in the specimen holder. With the grinder of the present invention, therefore, improved specimen flatness is achieved to facilitate the subsequent analysis of the specimens.

In one embodiment of the invention, a platen is provided for use in a metallographic grinder and an outer peripheral rim with a surface-oriented height reduction. In an embodiment for use with an individual force specimen holder, at least one flexible finger is provided for engaging the specimen to apply a force to the specimen against the platen. The at least one finger allows a specimen within a specimen holder to move laterally to some extent with respect to the specimen holder.

In yet another embodiment, a metallographic grinder is provided and includes a base rotatably supporting a generally disk-shaped platen, the platen having an outer peripheral rim with a surface-oriented height reduction. The grinder includes a head assembly positioned above the base and includes a specimen holder for positioning at least one specimen in contact with the platen. In yet another embodiment, the head assembly of a grinder includes at least one flexible finger engaging the specimen to apply a force to the specimen against the platen with surface-oriented height reduction and wherein at least one finger allows a specimen within the specimen holder to move laterally to some extent with respect to the specimen holder.

These and other features, objects and advantages of the present invention will become apparent upon reading the following description thereof together with reference to the accompanying drawings.

DETAILED DESCRIPTION OF THE PREFERRED EMBODIMENT

Figure 1:
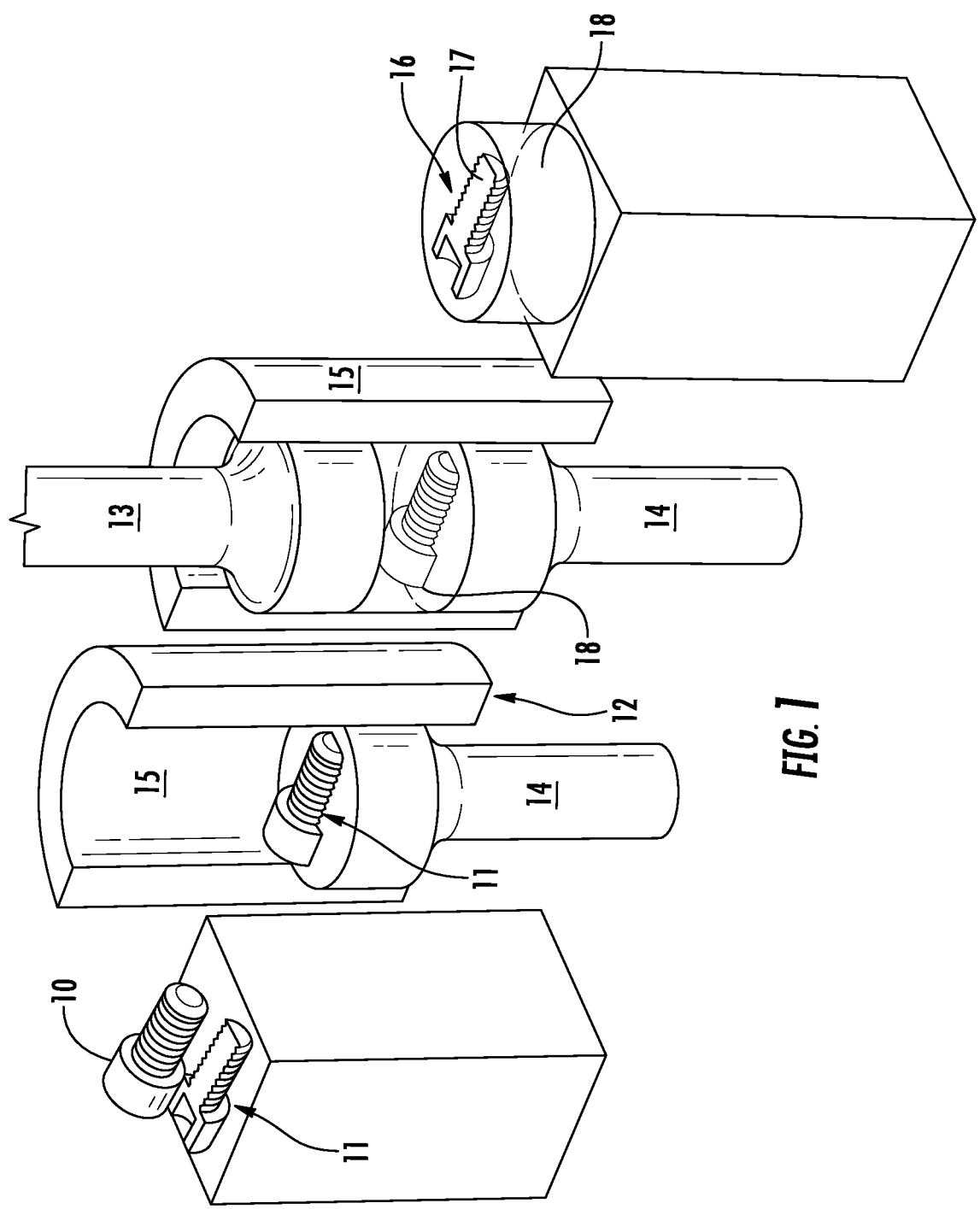
FIG. 1 is a sequence diagram illustrating from left-to-right the steps of preparing a part in a mount for subsequent grinding.

Referring initially to FIG. 1, there is shown a four-step sequence (from left to right) of preparing a part, such as a machine bolt for encapsulating into a puck-like mount for use in the grinder of the present invention. The bolt 10 is only an example of one of numerous items on which a company may want to perform a metallographic analysis. In this example, the manufacturer wants to determine the hardness of threads of the bolt. In FIG. 1, a machine bolt 10 is shown in its initial form and is first cut in half, as shown at 11. The machine bolt is then placed in a mounting press 12 which includes upper and lower pistons 13 and 14, respectively, and a pressure cylinder 15 to allow the part 11, such as the cutaway bolt, to be encapsulated into a puck-like mount 18 utilizing a thermosetting material, such as phenols, acrylics, epoxies, or other resins typically employed for forming specimen 16, such as bolt 10, for analysis. The mount 18, including the metallographic part, can be formed utilizing a mounting press of the type disclosed in U.S. Pat. No. 7,404,707, the disclosure of which is incorporated herein by reference. The specimen 16 is inverted, as seen on the right side of FIG. 1, when removed from cylinder 15 to expose the unfinished surface 17 of the bolt within the mount 18.

Figure 2:
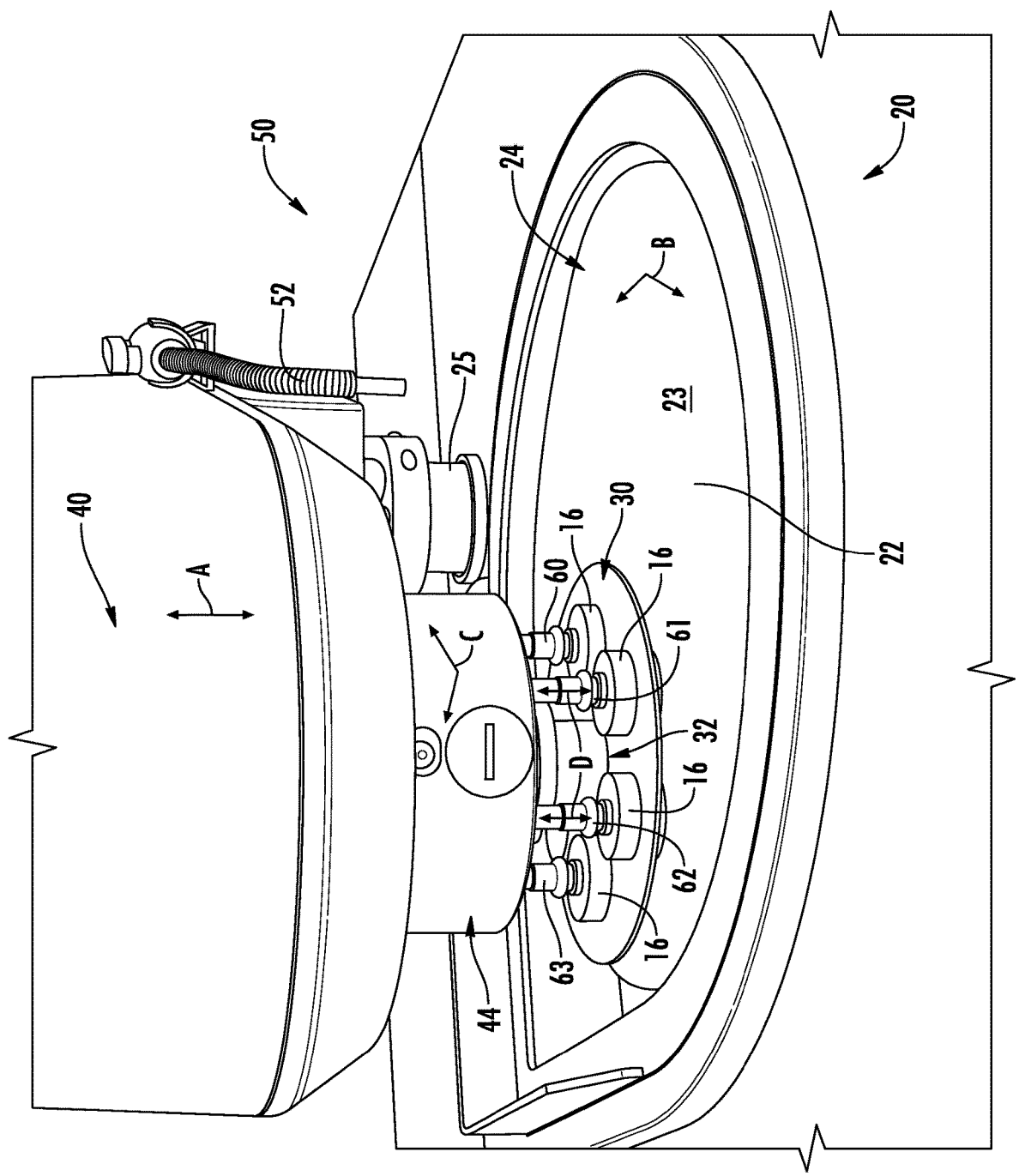
FIG. 2 is a fragmentary perspective view of a grinder embodying the present invention.

Turning now to FIG. 2, there is shown a grinder 50 embodying the present invention.

The grinder 50 includes a base assembly 20 and a head assembly 40. The head assembly 40 is vertically movable with respect to the base assembly 20 by means of an interconnecting movable mounting post 25, which allows vertical movement of the head assembly 40 up and down, as shown by arrow A in FIG. 2, with respect to base assembly 20. A platen 24 is rotatably supported by base assembly 20 and rotatably driven by a motor contained within the base assembly 20 in a conventional manner to rotate at variable speeds in either direction, i.e., either counterclockwise or clockwise, as illustrated by arrow B in FIG. 2. The platen 24 can range typically from 8 inches to 12 inches in diameter depending upon a particular machine 50. The upper surface of the platen 24 is covered by a removable abrasive pad 22 (FIG. 7), which has a lower adhesive or magnetic side 21 to allow its positioning and adhesion to the generally disk-shaped platen 24 and be changed to different grits during the grinding steps. Typically, pad 22 has an upper abrasive surface that ranges from about 60 grit to about 1200 grit, and the grinding process frequently requires three to four replacements for the adhesive pads 22 from a coarser grit (lower number) to a finer grit for final grinding. The movement of head assembly 40 upwardly and away from platen 24 allows easy replacement of the pad 22 as well as positioning the specimen 16 in the specimen holder 30. The thickness of the abrasive pads 22, which cover the upper surface of the platens 24, is about 0.02 inches. This allows the grinding surface 23 of the pad 22 to conform to the shape of the upper surface of the platens 24. Typically, the platen will generally be disk-shaped as will be the abrasive pad, however, other geometries of the platen and pad may employ the features of these inventions.

The head assembly 40 includes a specimen driver 44, which is generally cylindrical and which is driven by a motor in a conventional manner within head assembly 40 to rotate in either in a clockwise or counterclockwise direction as indicated by arrow C, either in the same direction as platen 24 or in an opposite direction during the grinding process. Typically, the platen 24 is rotated from about 50 to about 600 rpm and preferably about 300 rpm. The specimen driver 44, on the other hand, typically rotates at a slower speed from about 10 to about 150 rpm and preferably about 75 rpm.

Figure 3:
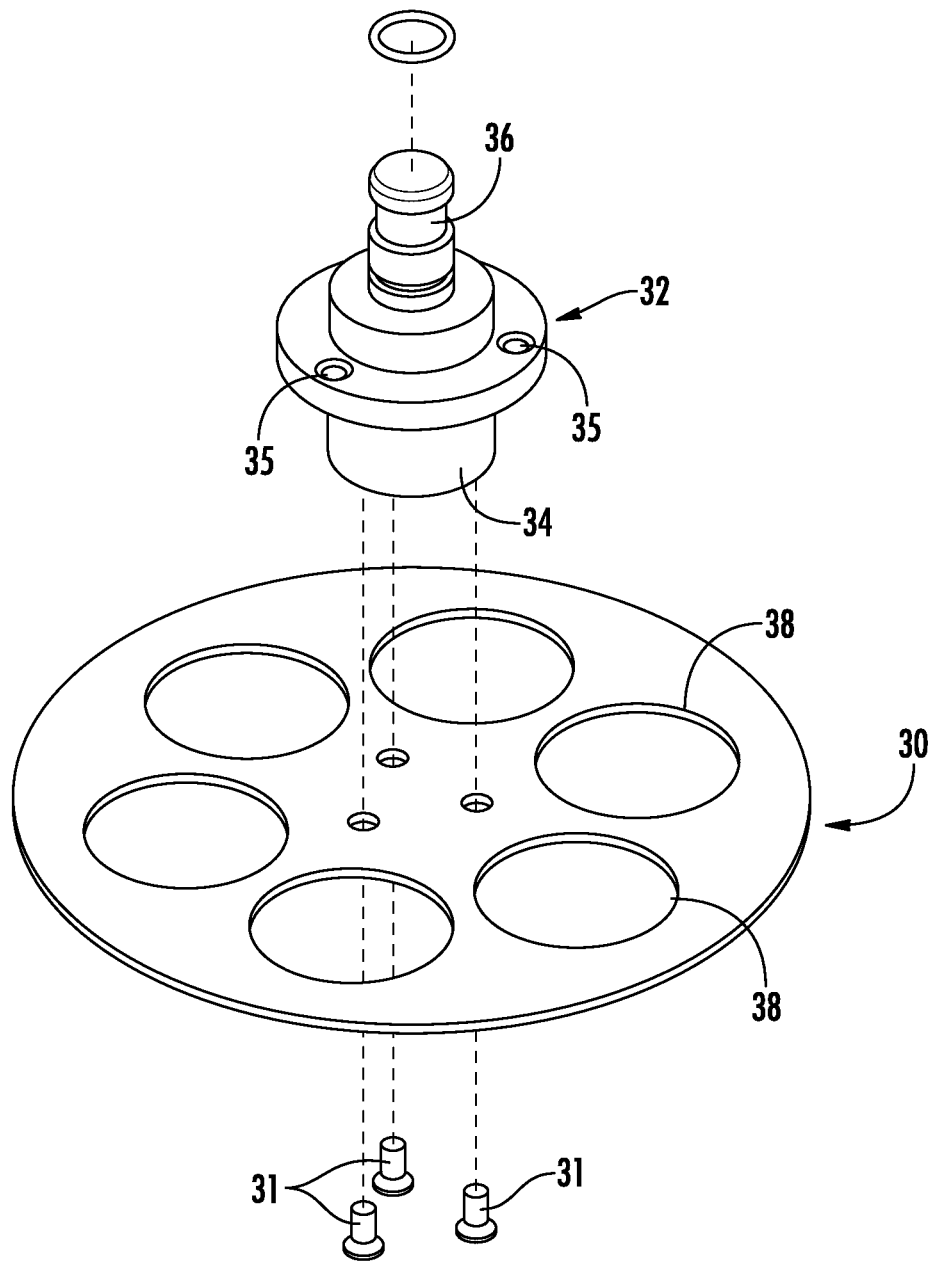
FIG. 3 is an exploded perspective view of an individual force specimen holder and hub for attaching the specimen holder to the specimen driver shown in FIG. 2.
Figure 3A:
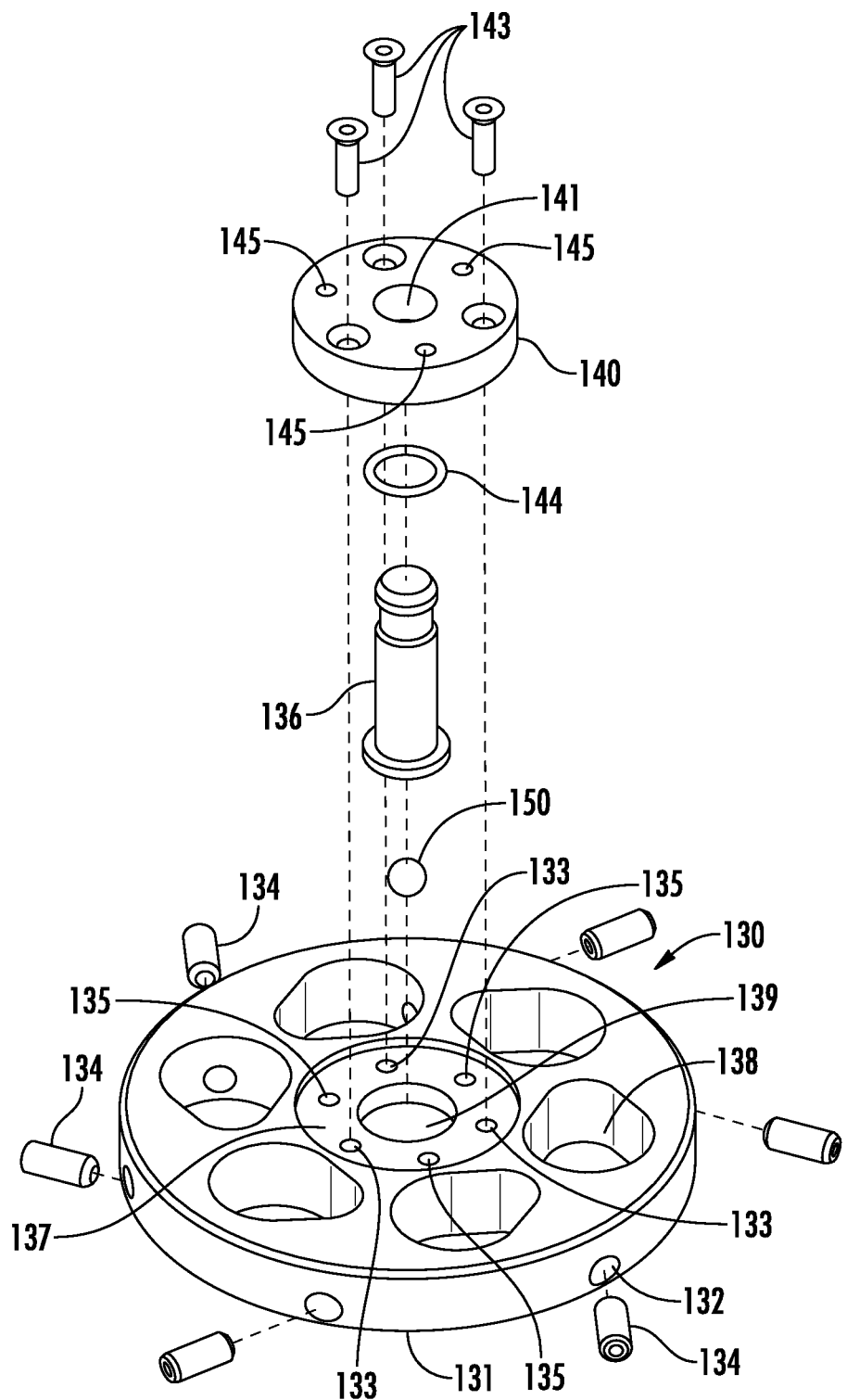
FIG. 3A is an exploded perspective view of a central force specimen holder and hub for attaching the specimen holder to the driver shown in FIG. 2.

A specimen holder 30 is coupled to a hub 32, as seen in FIG. 3, by means of fastening screws 31, which are threaded into the lower cylindrical end 34 of hub 32. The hub 32 snap-fits within the specimen driver 44 by means of a snap-fit coupling 36 and suitable interlocking pins (not shown) in specimen driver 44 which engage apertures 35 in hub 32 to rotate specimen holder 30 with driver 44. The snap-fit coupling 36 allows removal and replacement of specimen holder 30. This allows different types of specimen holders to be used, such as an individual force specimen holder (FIGS. 3-5) or a central force specimen holder (FIG. 3A). The former is the specimen holder 30 of the preferred embodiment which can be disk-shaped and includes six equally spaced (60°) apertures 38 having a diameter of about 1.515 inches for loosely receiving the specimens 16, which have a diameter of 1.5 inches. Thus, there is 0.015 inch between the inner diameter of apertures 38 and the outer diameter of specimen 16 to allow the specimens to move to some extent within the specimen holder 30 during the grinding process. For specimens ranging in size from about 1 inch to about 2 inches, the gap in diameters between specimens 16 and apertures 38 in the holders would remain about 0.015 inch. This random movement using flexible holding fingers, as disclosed below, improves the flatness of the specimen surfaces 17 (FIG. 1).

Figure 5:
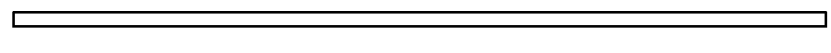
FIG. 5 is a side elevational view of the individual force specimen holder.
Figure 4:
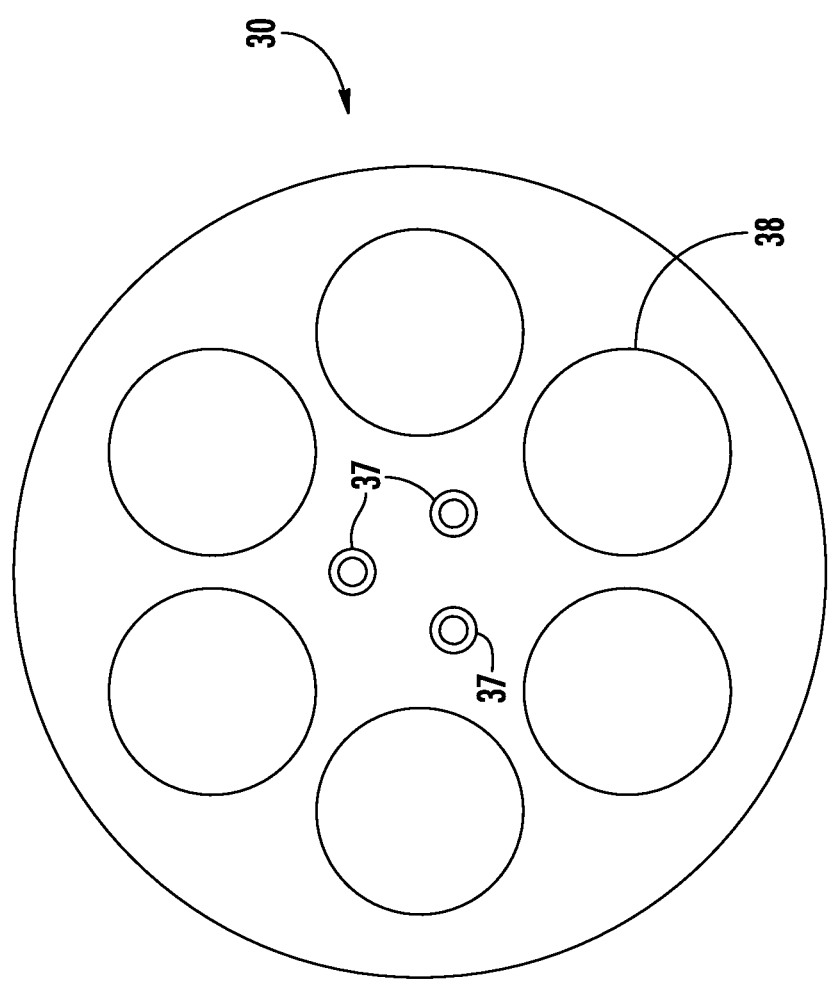
FIG. 4 is a top plan view of the individual force specimen holder.

Specimen holder 30 is shown in detail in FIGS. 3-5 and includes three apertures 37 which allow fasteners 31 to attach the specimen holder 30 to the hub 32. The specimen holder is typically 6 inches in diameter as compared to the 8 inch to 12 inch diameter platen 24. Head assembly 40 positions the specimen holder 30, spaced above and offset from the axis of rotation of the platen 24, in a position as seen in FIG. 2 for the grinding operation. Specimen driver 44 (FIG. 2) includes six flexible fingers 60-65 that align with and engage the upper surfaces of specimens 16 captively held by specimen holder 30. The fingers 60-65 may be vertically movable to be retractable within head 44, as shown by representative arrows D in FIG. 2, and may be spring-loaded and which, as described below in connection with FIGS. 15-19, engage with the upper surface 19 of specimens 16 to apply a downward force of from about 1 to about 12 pounds and preferably 4 pounds on the surface 17 of specimen 16, pressing it against the grinding surface 23 of abrasive pad 22 during the grinding process. Specimen holder 30, in one embodiment, is 6 inches in diameter, made of stainless steel or aluminum, and has a thickness of about 0.075 inch.

An alternative central force type specimen holder 130 is shown in FIG. 3A and includes a plurality of specimen-holding apertures 138 for holding specimens 16 of the same type previously described above. The holder 130 is a relatively thick plate as compared the individual force specimen holder 30 in the prior embodiment. Holder 130 includes axially extending apertures 132 for receiving locking screws 134 to secure a specimen in fixed relationship within each of the apertures 138, with the lower surface 17 of the specimens 16 positioned approximately ⅛ inch below the surface 131 of specimen holder 130. Thus, the specimens are in locked positions with respect to holder 130, which is attached to the specimen driver 44 by a shaft 136 held within a central recess 137 of holder 130 by a circular retainer plate 140. Fastening screws 143 are threaded into apertures 133 within the recess 137 of holder 130. Retainer plate 140 has a central aperture 141 which slides over shaft 136 and is sealably coupled thereto with an O-ring 144. The bottom of shaft 136 conventionally includes a conical recess for retaining a ball bearing 150 which engages the upper surface of conical floor 139 of holder 130 to allow the holder 130 to tilt during the grinding process to follow the contour of the different platen configurations. When the central force specimen holder 130 is employed with the new platen configuration described below in FIGS. 6-14, it achieves dramatically improved flatness for the specimens 16 fixed in apertures 138 by locking screws 134 due to the geometry of the platens 24 provided as described below. The retainer plate 140 also includes three apertures 145 which receive pins of the specimen driver, as in the previous embodiment, and also may extend into corresponding apertures 135 in the specimen holder.

As the specimen driver 44 rotates, specimens 16 are moved from the center of the platen 24 near its axis of rotation toward the outer peripheral edge thereof. In the grinding steps, the specimen is abraded and, together with broken or dislodged abrasive particles from the grinding surface 23, forms a granular material known as swarf. In an effort to reduce the adverse effect of swarf on the overall grinding step, the grinder 50 typically includes a water dispensing nozzle 52 for directing water onto the surface 23 of the pad 22 attached to the platen 24 to assist in the grinding step and, to some extent, to remove the swarf.

Before describing further details of the structure of the invention, an overview of the operation of the grinder machine 50 is provided in reference to FIG. 2. The sequence of operation includes lowering the head assembly 40 to position the specimen holder 30 in spaced relationship above the abrasive pad 22 a distance such that the specimens 16 can extend through the apertures 38 in the specimen holder 30 and be captively held at approximately ⅛ inch from their bottom to the platen 24 by the specimen holder 30. At this point in time, fingers 60-65 are retracted within the specimen driver 44 to allow the operator to load the specimens 16 into the awaiting empty apertures 38 of specimen holder 30.

Next, water or other fluid from nozzle 52 is activated, and fingers 60-65 are lowered to individually engage the upper surfaces 19 (FIGS. 15-19) of the specimens 16. At this time, the rotation of platen 24 is initiated, as is rotation of the driver 44, such that the specimens 16 are swept over the abrasive surface 23 of pads 22 and periodically move above the outer reduced thickness edge 26 of platen 24. The grinding step lasts for one to five minutes and, more typically, from one to two minutes, after which it is stopped and the pad 22 replaced with a finer grit pad. Two to three pad changes are typically required to achieve the desired flatness of the specimen surface 17. Between pad replacements, the fingers 60-65 are retracted. Head assembly 40, including the specimen driver 44, is raised to allow the finished specimens 16 to be removed for subsequent analysis either by a micro hardness tester, microscopy, or other analytical instruments.

The grinder 50 of the present invention includes two structural components which individually and/or collectively allow the surface 17 of a specimen 16 to be ground flat to 0.0004 inch over the entire surface of the specimen. Prior art grinders typically achieve flatness of only 0.002 inch to 0.004 inch. This unexpected and remarkable at least ten fold improved result is due to the platen geometry and/or the use of flexible fingers 60-65, allowing specimens 16 to move laterally to some extent in specimen holder 30 eliminating tipping forces on the specimens during grinding. Otherwise, the tipping forces would cause the surface 17 to be ground to a conical shape. The platen design promotes the removal of swarf from the grinding surface due to the surface-oriented height reduction of the platen near the outer periphery of platen 24. The platen design, which at least partially promotes this result, is due to the surface-oriented height reduction of the platen near the outer periphery of platen 24.

Figure 6:
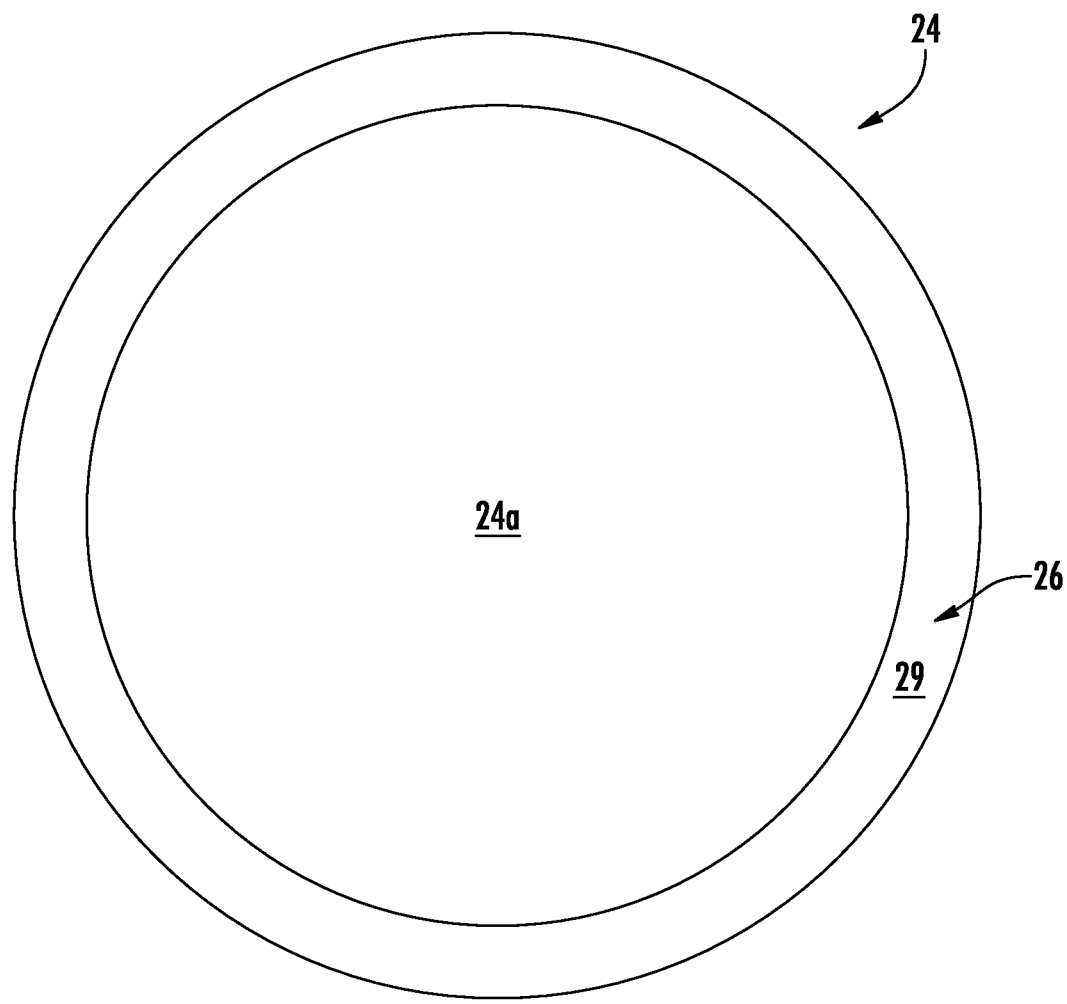
FIG. 6 is a top plan view of a platen employed in the grinder shown in FIG. 2.
Figure 7:
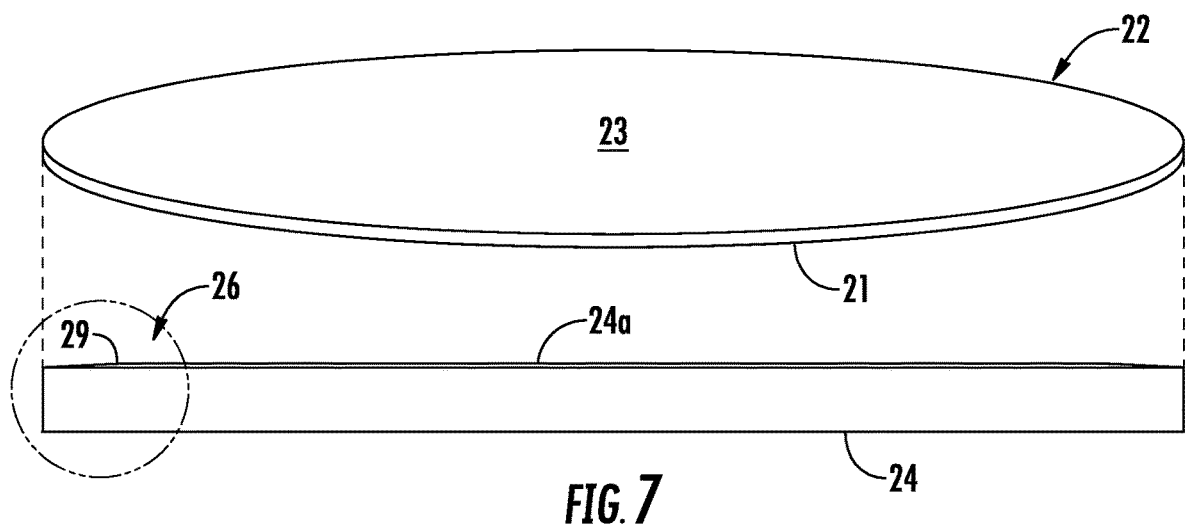
FIG. 7 is a side elevational view of the platen shown in FIG. 6, showing in exploded perspective view an abrasive pad used with the grinder.
Figure 8:
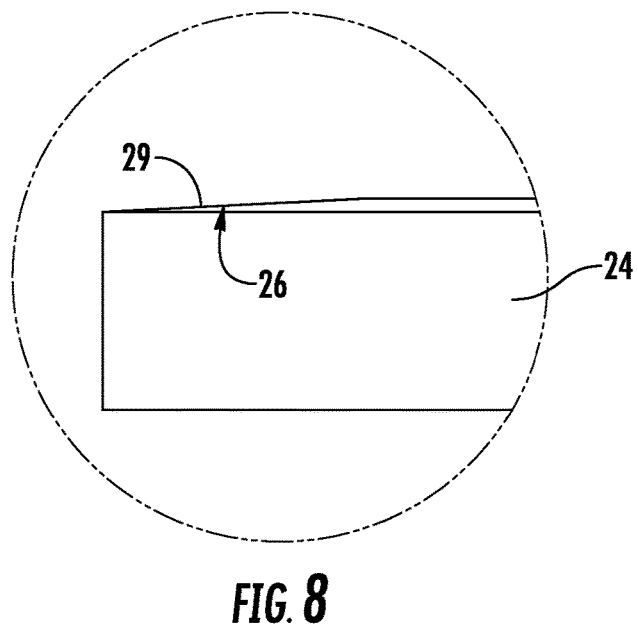
FIG. 8 is an enlarged fragmentary view of a the circled area of FIG. 7, showing a first structure for providing surface-oriented height reduction of the outer peripheral edge of the platen.

As seen in FIGS. 6-8, showing the first embodiment of the platen design, a first platen 24 is shown and has a diameter of typically 8 to 12 inches. The platen has a center area 24a in each of these designs. The outer peripheral edge 26 has a surface-oriented height reduction as compared to the center area in the embodiment shown in FIGS. 6-8 of about 0.01 inch to about 0.1 inch and preferably 0.04 inch provided by linear chamfer 29 of from about 1.5° to about 6° and preferably 3°, as illustrated in FIG. 8. The chamfer in the area 26 has a width of from about 0.5 inch to about 1 inch and preferably 0.75 inch. Thus, as the specimen 16 is moved by the rotating specimen holder 30 near the edge of disk 22 supported by the chamfered peripheral edge 26 of platen 24, any swarf buildup is exposed to the surface-oriented height reduction area 26 and the debris moves off the platen 24 from the abrasive interface grinding surface 23 between the surface 17 of specimen 16 and pad 22 by a combination of the centrifugal force of the platen 24 and the water from nozzle 52. A gap of about 0.04 inch is provided by the chamfer 29. This again allows the swarf to escape the interface between surface 17 of a specimen being ground and surface 23 of the abrasive pad 22. Otherwise, the swarf could unevenly erode the surface 17 of the specimen 16, leading to an undesirable uneven surface 17.

Figure 9:
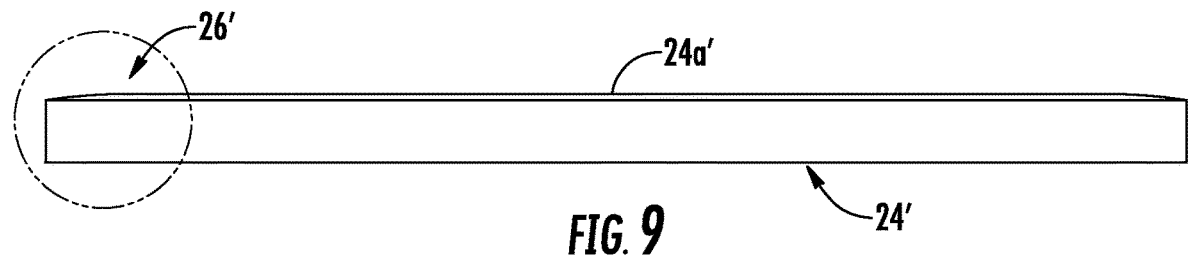
FIG. 9 is a side elevational view of an alternative structure for surface-oriented height reduction of the platen at the outer periphery.
Figure 10:
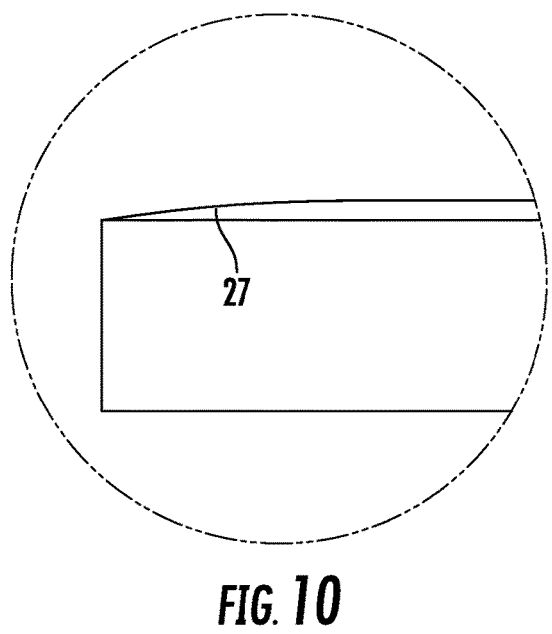
FIG. 10 is an enlarged view of the circled area shown in FIG. 9.

Instead of the linear chamfer as shown in the embodiment of FIGS. 6-8, a platen 24' may include a surface-oriented height reduction area 26', as shown in FIGS. 9 and 10, which is the same as area 26 of FIGS. 6-8 but which is continuously curved at a radius arc of approximately 5 inches, as indicated at 27 in FIG. 10. Thus, the surface-oriented height reduction area 26' of about 0.04 inch of platen 24' is provided by a downwardly and outwardly curved radius at the outer edge 26' of platen 24'. This allows the swarf to escape the interface between surface 17 of a specimen being ground and surface 23 of the abrasive pad 22.

Figure 11:
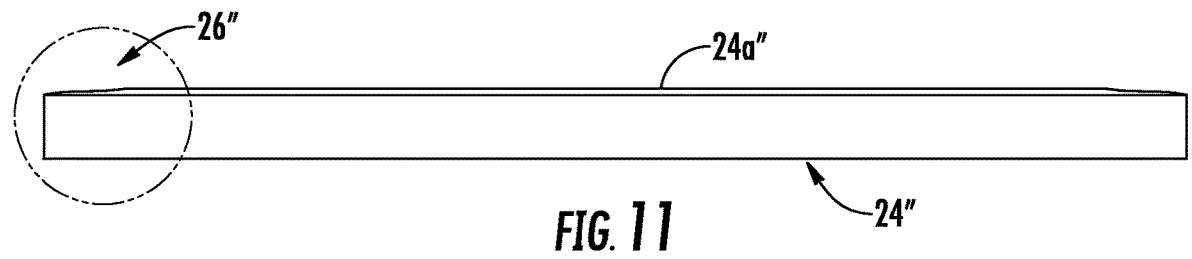
FIG. 11 is a side elevational view of an alternative platen illustrating yet another structure for surface-oriented height reduction of the outer periphery of the platen.
Figure 12:
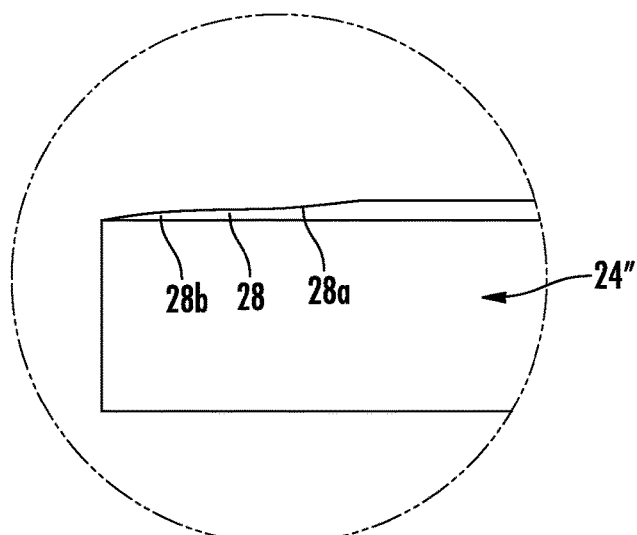
FIG. 12 is an enlarged view of the circled area shown in FIG. 11.

In another alternative embodiment of the present invention shown in FIGS. 11 and 12, a platen 24" is provided and has a surface-oriented height reduction area 26" of about 0.04 inch at its outer edge provide by a compound curve 28 including a first section 28*a*, which is concave as viewed in FIG. 12, and a second recurved section 28*b*, which is convex to provide a wave shape to provide the surface-oriented height reduction area 26" of platen 24". Sections 28*a* and 28*b* are curved at a radius of about 2 inches. The surface-oriented height reduction area 26" of about 0.04 inch of platen 24" is provided by the downwardly and outwardly recurved sections 28*a* and 28*b* at the outer edge 26" of platen 24". The relatively thin pad 22 used in each embodiment allows the pad to conform to the platens, including the recurved outer edge 26" of the platen 24". This allows the swarf to escape the interface between surface 17 of a specimen being ground and surface 23 of the abrasive pad 22.

Figure 13:
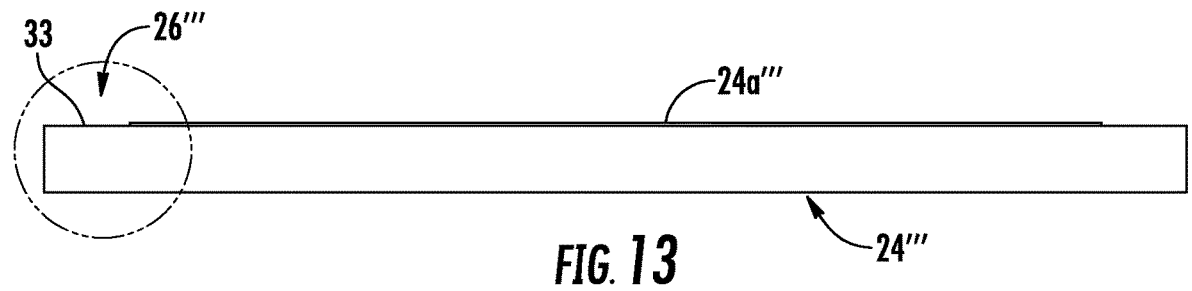
FIG. 13 is a side elevational view of yet another embodiment of the platen in which surface-oriented height reduction of the outer periphery is provided.
Figure 14:
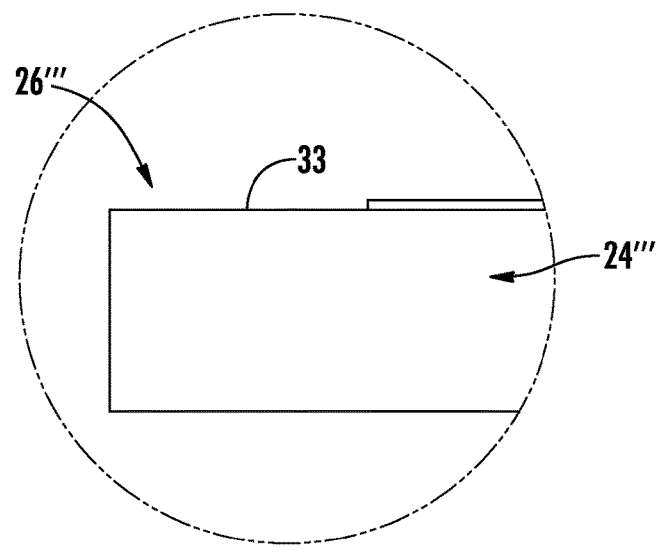
FIG. 14 is an enlarged fragmentary view of the circled area shown in FIG. 13.

In yet another alternative shown in FIGS. 13 and 14, the reduction in thickness of about 0.04 inch to the outer periphery 26''' of the platen 24''' employed in the grinder 50 of the present invention is achieved by another structure. The platen 24''' includes a surface-oriented height reduction area 33 at the outer peripheral area 26''' having a depth of about 0.04 inch. The relatively thin abrasive pad 22 (FIG. 7), which is adhered to the center area 25''' of platen 24''', drapes down over area 33 to provide a smooth surface-oriented height reduction outer edge presented to a specimen being treated. Thus, this provides surface-oriented height reduction of the platen and a release area for the swarf to be discharged from the abrasive pad 22 of grinding machine 50 during its operation.

Having described the base assembly 20 together with the various platen configurations which can be used with either type of specimen holder 30 (FIG. 3-5) or 130 (FIG. 3A), a description of the flexible finger structures contained within the specimen driver 44 to achieve their lateral movement allowing the specimens 16 to move within the oversized apertures 38 in specimen holder 30 without encountering tipping forces is now described. There are several manners in which the fingers 60-65 are configured to remove any tipping forces on the specimens 16. The first embodiment of such flexible fingers is shown in FIGS. 15A-15C.

Figure 15C:
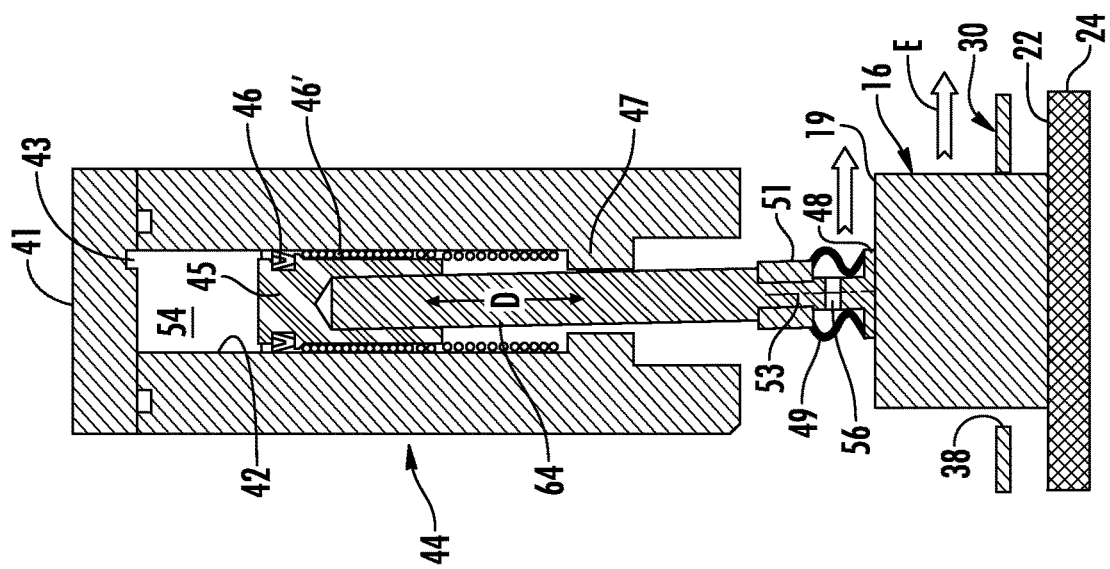
FIGS. 15A-15C are fragmentary vertical cross-sectional views of one of the specimen driver retractable fingers illustrating its lateral movement during the grinding operation.
Figure 15B:
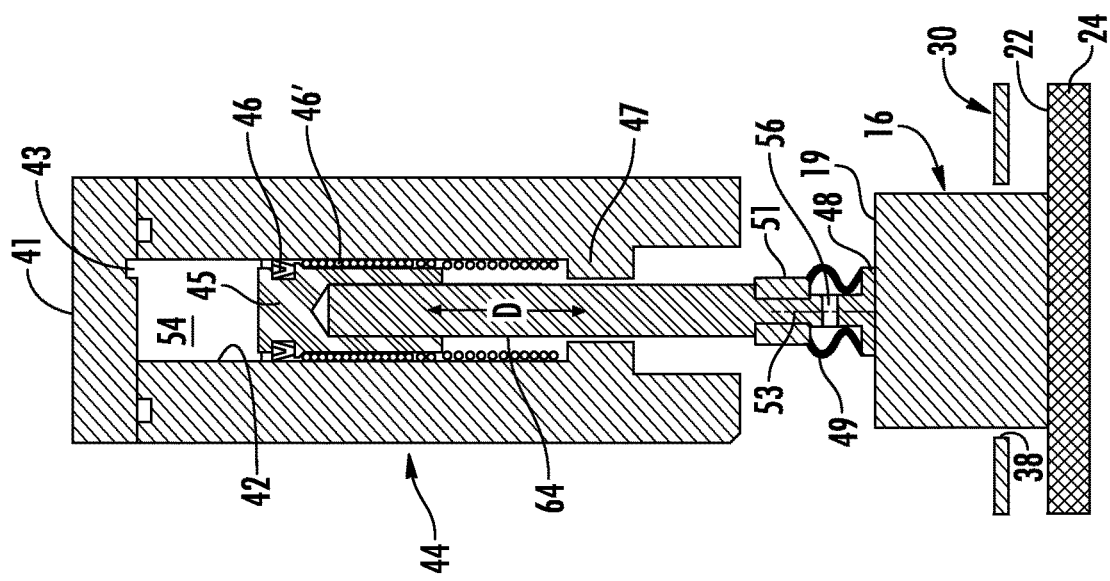
Figure 15A:
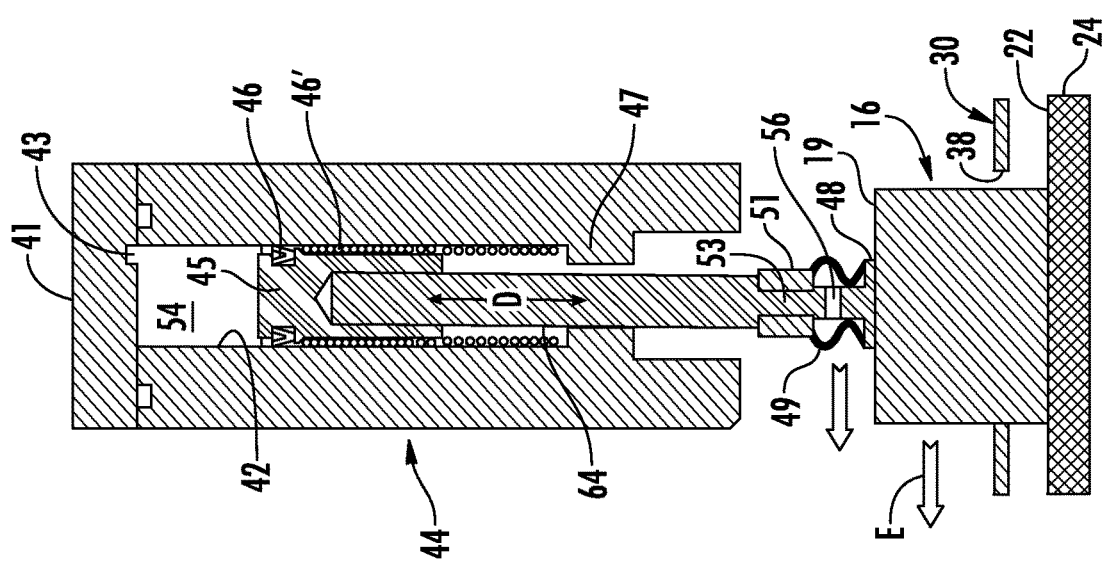
Figure 15D:
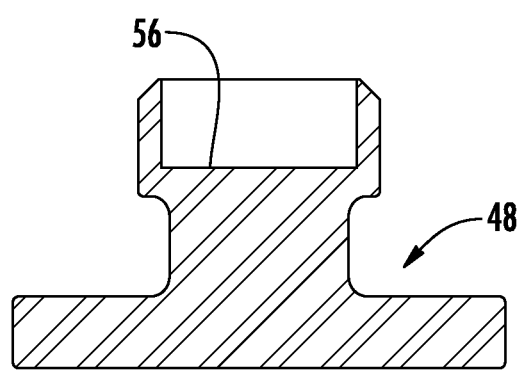
FIG. 15D is an enlarged cross-sectional view of one of the pads used with the fingers of FIGS. 15A-15C and 16A-16C.

In FIGS. 15A-15C, a fragmentary perspective view of one of the six cylindrical fingers of specimen driver 44 is shown. The specimen driver 44 includes six equally spaced cylinders 42 at an arcuate distance of about 60° and which are aligned with apertures 38 in the specimen holder 30. This positions the cylindrical fingers 60-65 in alignment with the specimens 16, as shown in FIG. 2. One of the cylinders 42 is shown in FIGS. 15A-15C and includes head 41 defining a chamber 54 which receives a source of compressed air through conduits 43 to actuate a piston 45 with suitable sealing rings 46. Finger 64 (shown in these figures) is secured to the lower end of piston 45. A return compression spring 46' surrounds the lower end of piston 45 and finger 64 abuts against the top surface of inwardly projecting guide 47 near the lower end of cylinder 42 in spaced relationship to the piston 45. In each of the following embodiments, pressure is selectively applied to chambers 54 by a suitable conventional electro-pneumatic control to lower fingers 60-65 during the grinding operation. When the pressure is released, the return springs 46' retract the fingers into the specimen driver 44. The diameter of finger 64 and the remaining fingers 60-63 and 65 are reduced, such that there is a gap of about 0.0625 inches between the outer diameter of the fingers 60-65 and the inner diameter of inwardly projecting guide 47 to allow lateral movement of the fingers and specimens 16 to which they are coupled. Fingers 60-65 are each cylindrical rods which extend from the pistons for selectively moving the fingers between a retracted position within specimen driver 44 to extended positions downwardly into engagement with the specimens 16. Typically, the fingers are stainless steel cylindrical rods.

In FIGS. 15A-15C, each of the fingers 60-65 (64 shown) terminate in a pad 48 which engages the upper surface 19 of the specimen 16. Pad 48 has a cup-shaped upper end 56 (FIG. 15D) for receiving the end of finger 64. This junction is surrounded by a flexible rubber jacket 49 which is fixedly coupled to a collar 51, in turn, mounted to and surrounding a reduced diameter end 53 of finger 64. The gap between the lower end of finger 64 and inwardly projecting guide 47 allows the pad and specimen 16 to move laterally. Pressure applied to the chamber 54 above pistons 45 in each of the six mounting cylinders provides a force of about 1 to about 12 pounds and preferably about 4 pounds of the pad 48 against surface 19 and, therefore, the face of surface 17 (FIG. 1, right end) of the specimen 16 against the abrasive surface 23 of the disk 22 on platen 24 during the grinding operation. The gap between inwardly projecting guide 47 and the cylindrical rods 60-65 allow the rods to wobble laterally, as shown by arrows E, as the platen 24 and holder 30 rotate the specimens 16 against the abrasive pad 22, thus, minimizing any tipping forces which otherwise exist with fixed fingers. This flexibility assists in providing the very flat specimen results. The oversized apertures 38 in holder 30 allow the specimens 16 to also move laterally in each of the embodiments of FIGS. 15-19 during the rotation of the specimen holder 30.

Figure 16C:
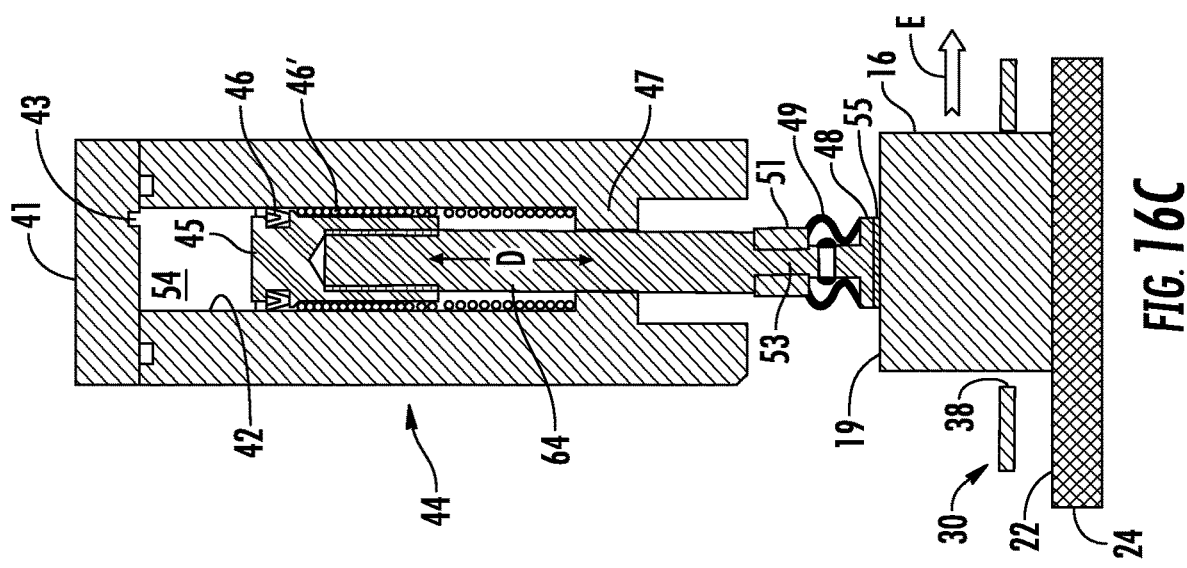
FIGS. 16A-16C are fragmentary vertical cross-sectional views of an alternative embodiment of one of the specimen driver retractable fingers illustrating its lateral movement during the grinding operation.
Figure 16B:
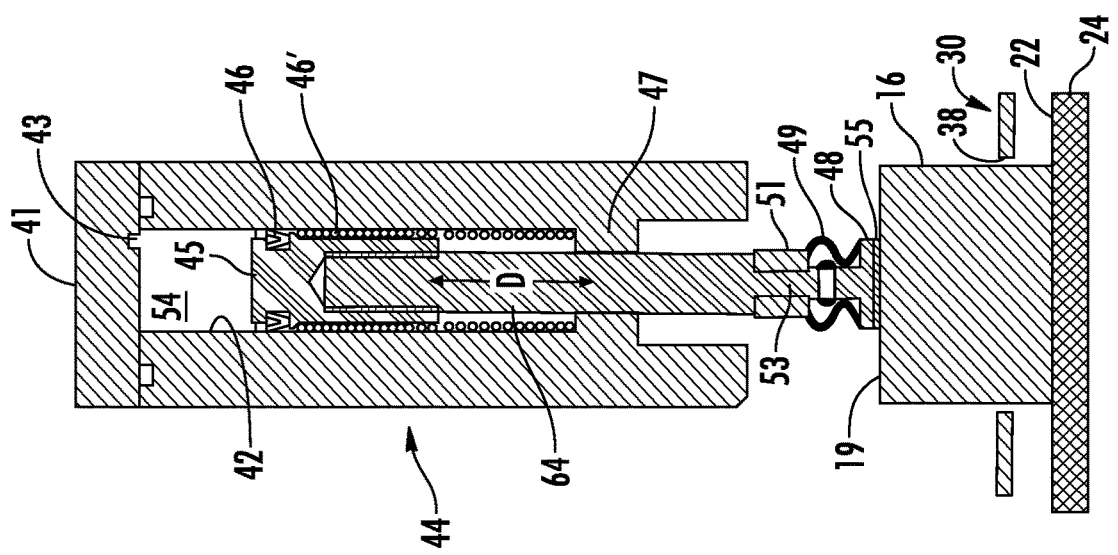
Figure 16A:
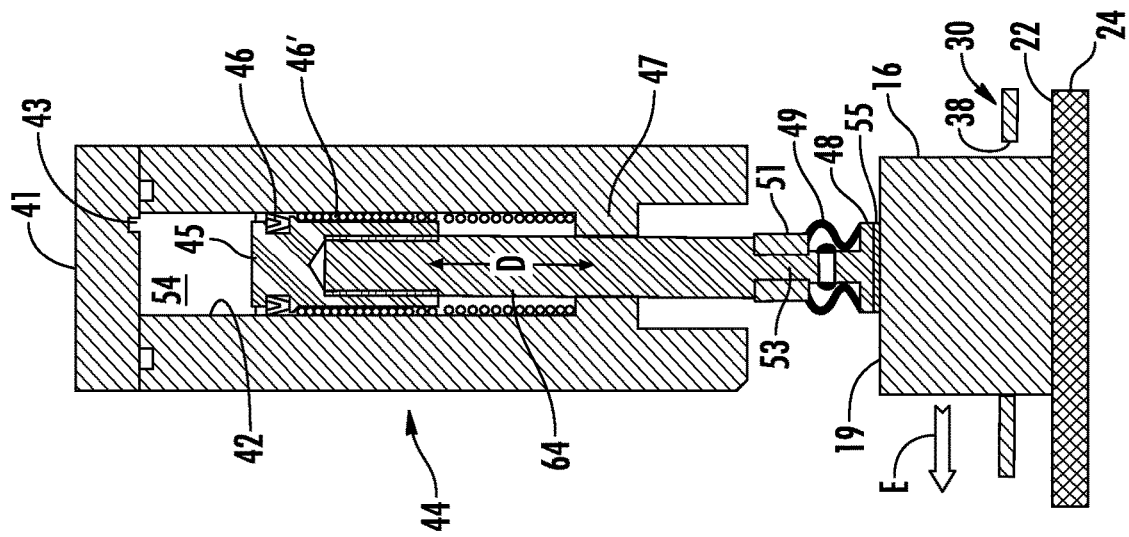

FIGS. 16A-16C show an alternative embodiment of each of the finger-holding cylinders of specimen driver 44 in which the inwardly projecting guide 47 and cylindrical rods 60-65 diameters are substantially the same but allow the rods 60-65 to slide up and down through inwardly projecting guides 47. A gap of about 0.002 inches between guide 47 and fingers 60-65 in each of the embodiments of FIGS. 16-18 allow the vertical movement. The fingers, thus, move vertically, as indicated by arrow D in these figures. The minimization of tipping forces on the specimen 16 is achieved in this embodiment by a low friction pad 55, such as Teflon®, positioned between the lower surface of pad 48 coupled to the end of finger 64, as shown in FIGS. 16A-16C. This allows the specimen 16 to move laterally in oversized apertures 38, as also illustrated by arrows E in FIGS. 16A-16C from side-to-side as the specimen holder 30 rotates driven by head 44 under the friction force of abrasive surface 23 of pad 22 rotated by platen 24. This achieves the minimization of tipping forces without modification of the finger mounting cylinders in specimen driver 44.

Figure 17C:
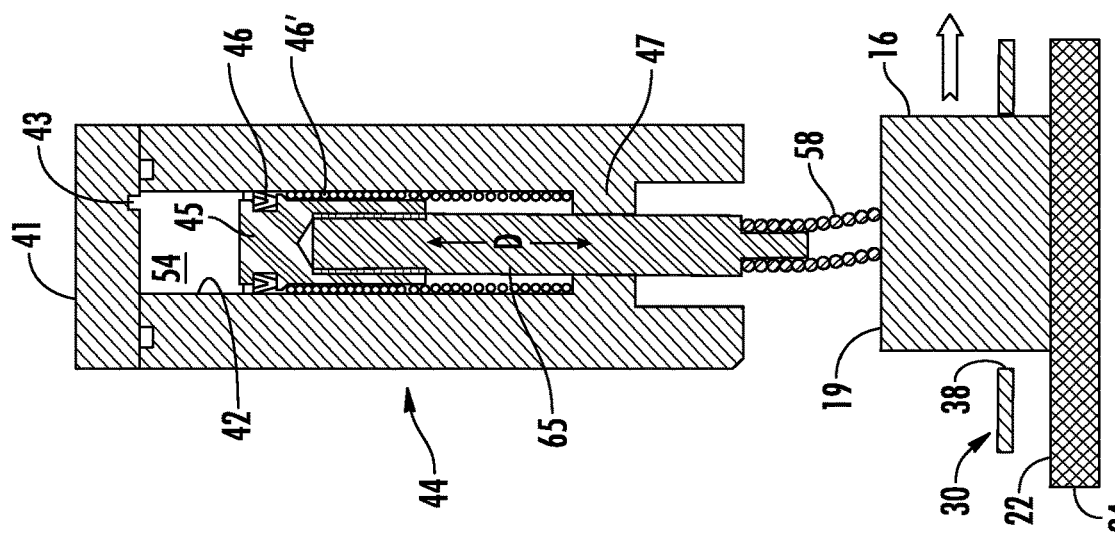
FIGS. 17A-17C are fragmentary vertical cross-sectional views of yet another embodiment of the specimen driver retractable fingers illustrating its lateral movement during the grinding operation.
Figure 17B:
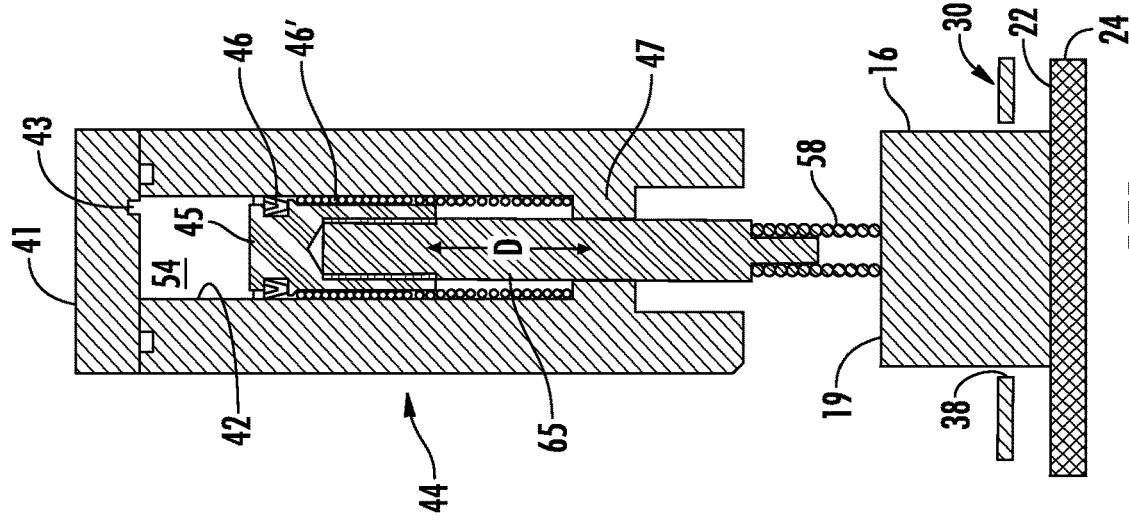
Figure 17A:
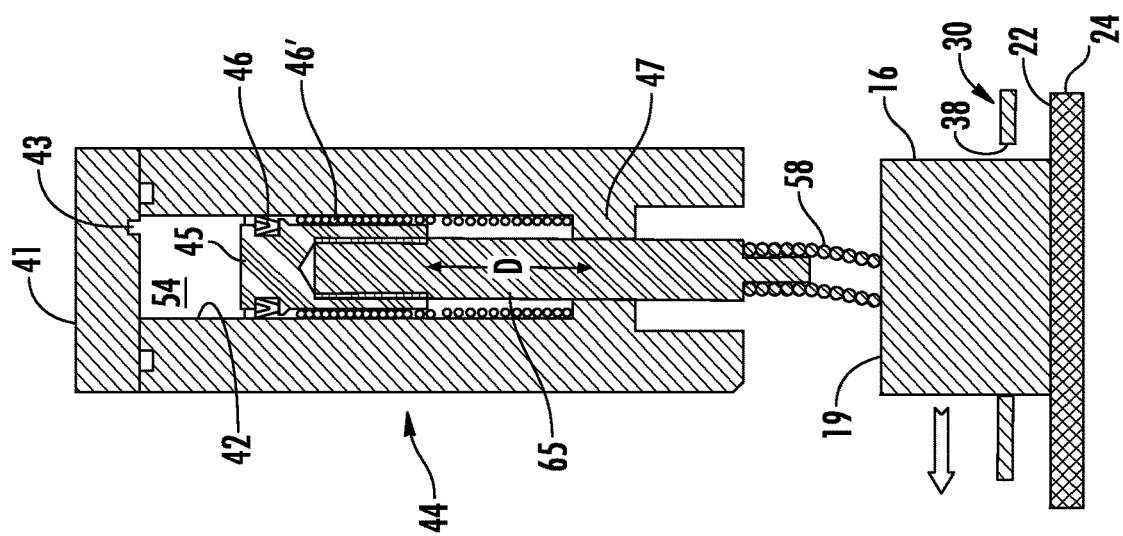
Figure 17D:
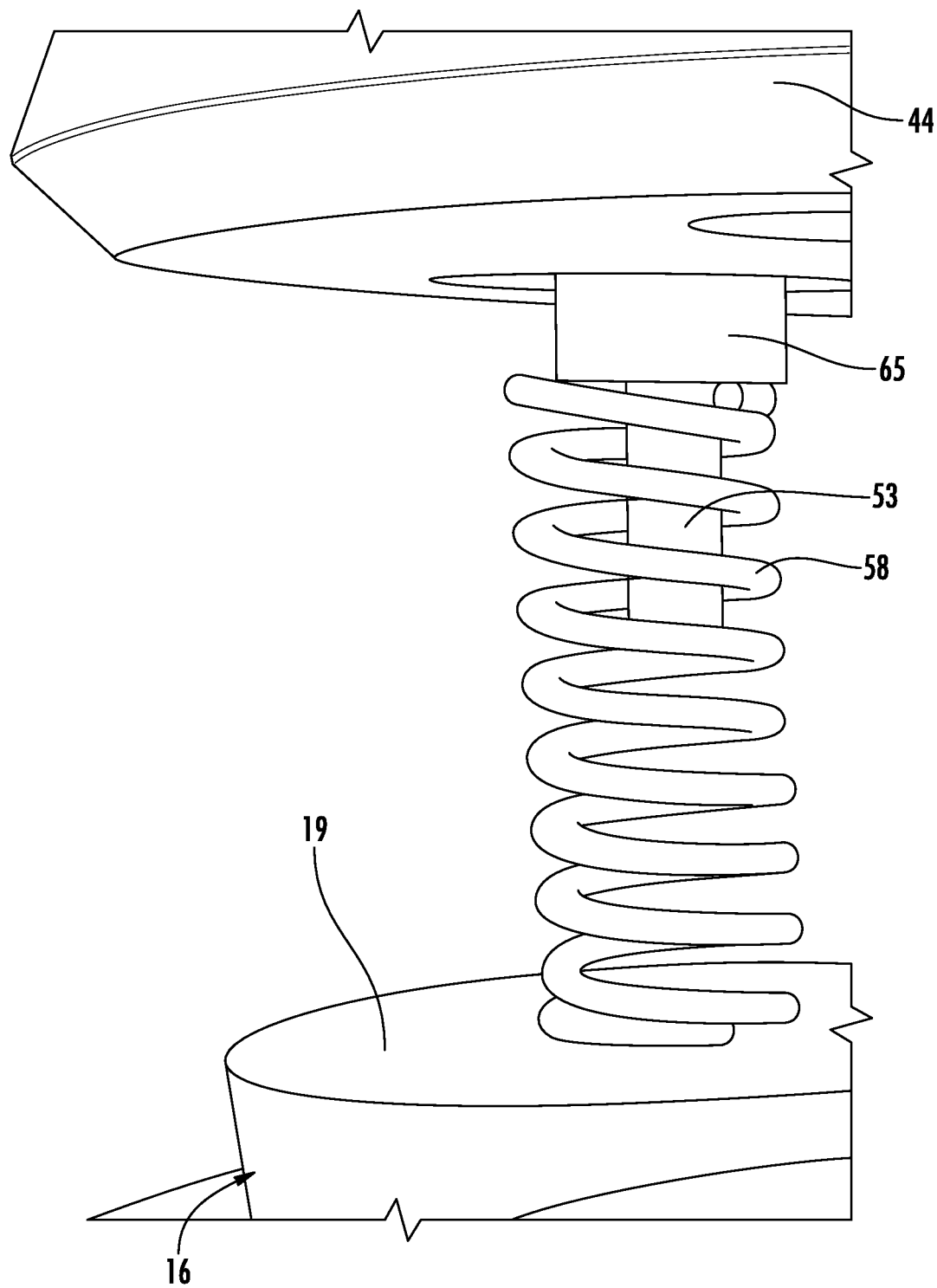
FIG. 17D is an enlarged fragmentary side elevational view of the finger shown in FIGS. 17A-17C.

In another embodiment shown in FIGS. 17A-17D, the same cylinder and structure as shown in FIGS. 16A-16C are employed but the end of fingers 65 (and similar fingers 60-64 in this embodiment) are coupled to the upper surface 19 of the specimen 16 by a spring 58 providing a true maximum load of about 15 pounds and having a length sufficient to allow the spring to flex from side-to-side, as shown in FIGS. 17A-17C, while providing a downward force on the specimen 16 against the abrasive surface 22 and allowing the specimen to move from side-to-side in the oversized apertures 38 in holder 30. Spring 58 itself is shown in FIG. 17D in which the compression spring 58 is shown captively held by and surrounds a reduced diameter end 53 of the finger 65.

Figure 18C:
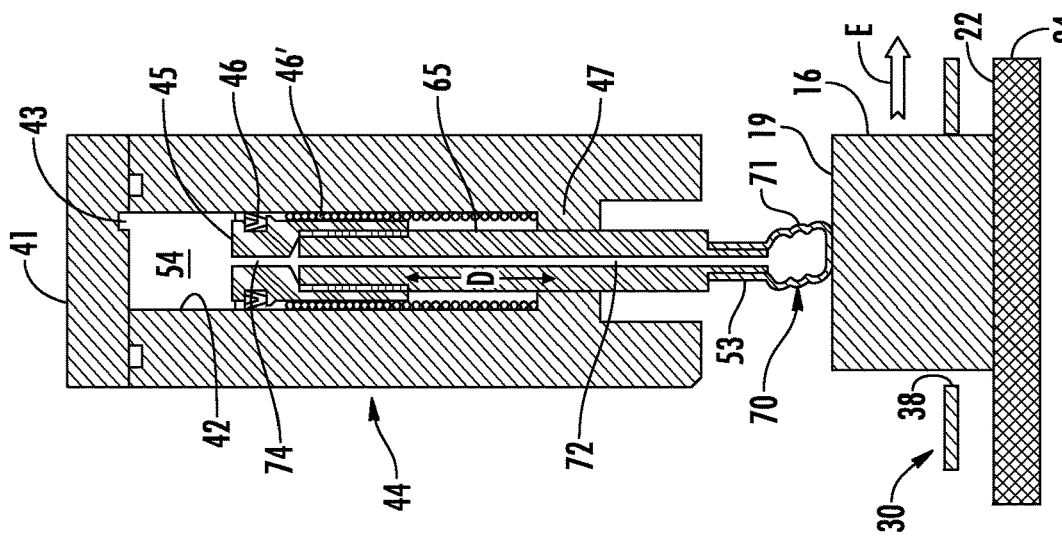
FIGS. 18A-18C are fragmentary vertical cross-sectional views of a further embodiment of one of the specimen driver retractable fingers illustrating its lateral movement during the grinding operation.
Figure 18B:
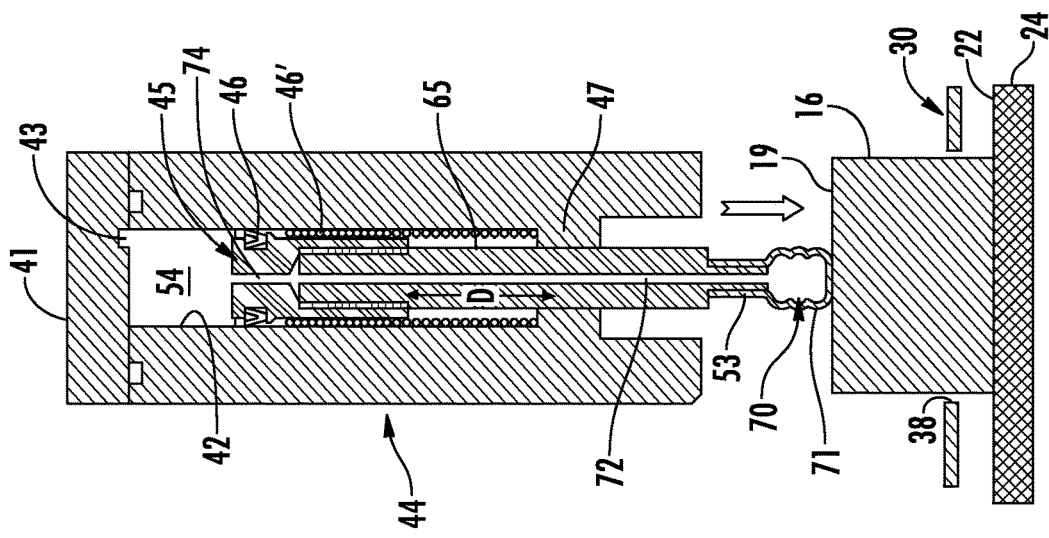
Figure 18A:
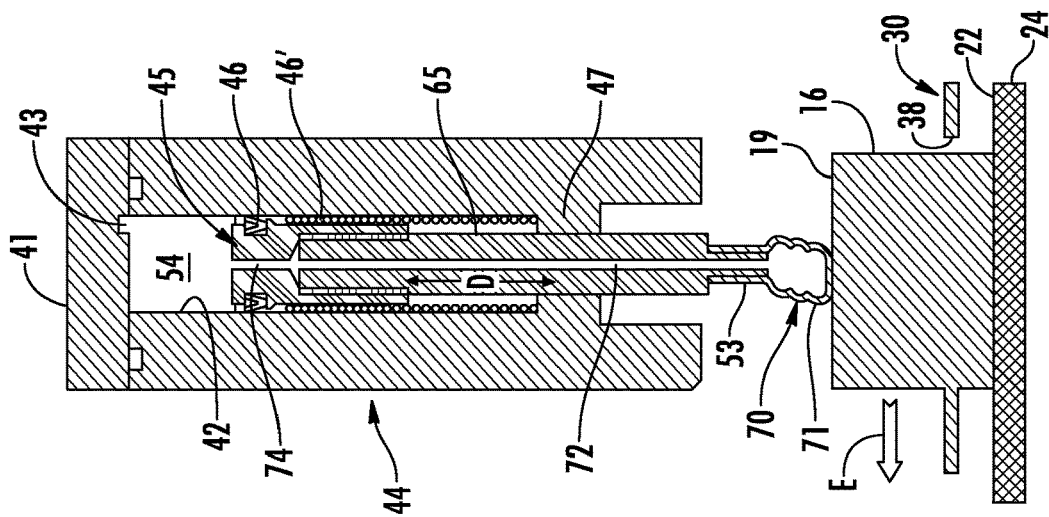

In yet another embodiment of the invention shown in FIGS. 18A-18C, the flexible interface between a finger 65 and the specimen 16 is achieved by an inflatable bellows 70, which is inflated or may be permanently inflated when pressure is applied to chamber 54 through passageway 72 extending axially through the finger 65 and communicating with a passageway 74 in piston 45. This lowers finger 65 and may simultaneously inflate bellows 70, which has a rippled side wall 71 to allow contact with the specimens and promote lateral movement of specimens 16 within holder 30 to, as in the other embodiments, thereby enhancing the grinding effect.

Figure 19C:
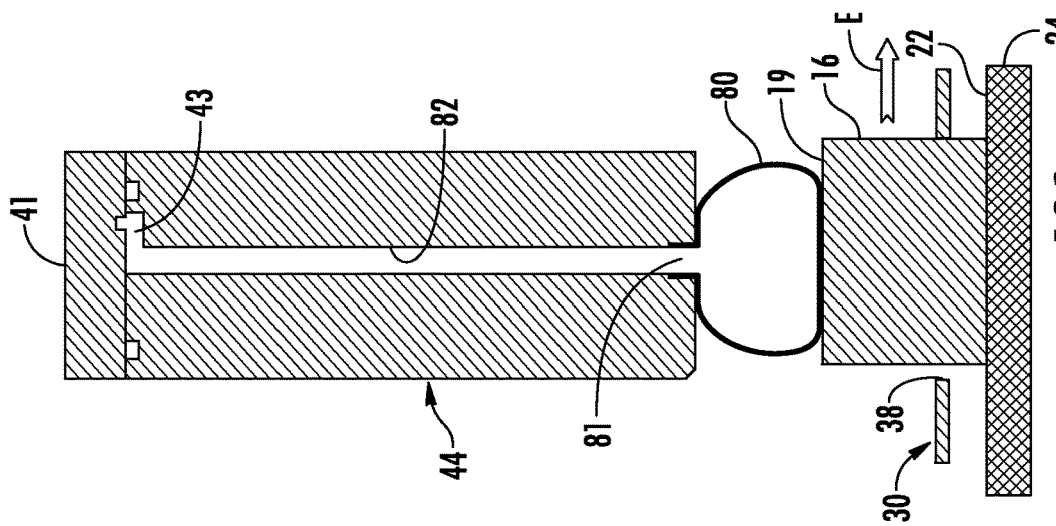
FIGS. 19A-19C are fragmentary vertical cross-sectional views of a further embodiment of one of the specimen drivers using an inflatable bladder and illustrating its lateral movement during the grinding operation.
Figure 19B:
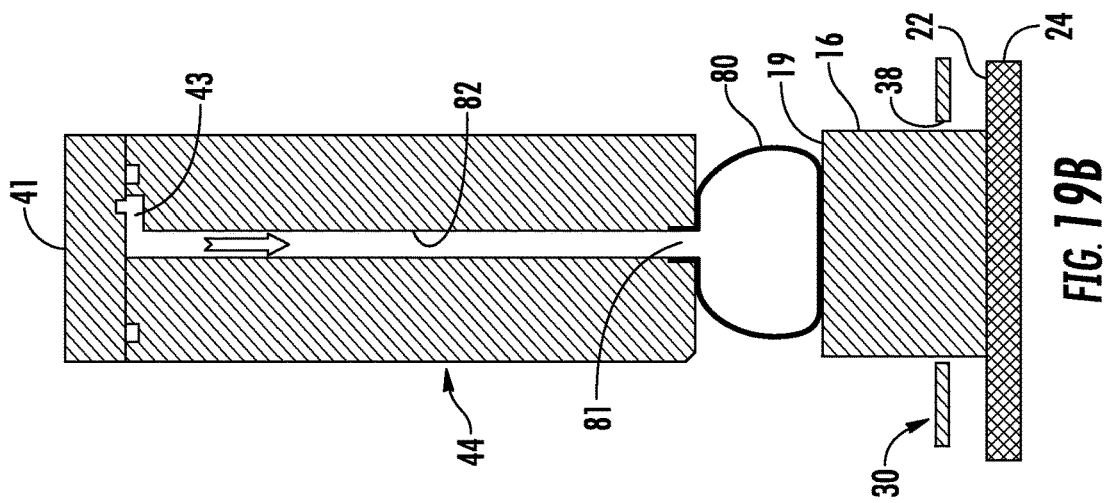
Figure 19A:
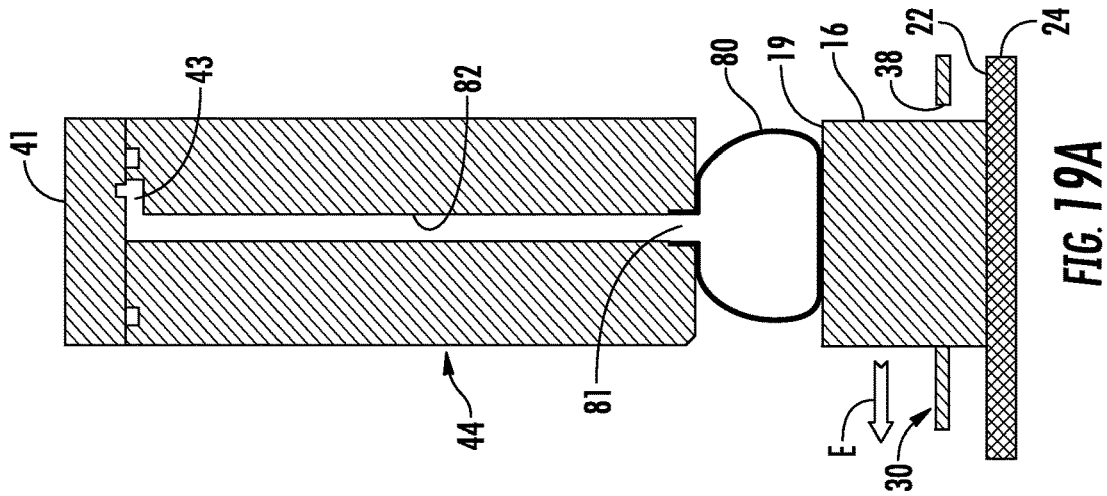

Instead of the retractable fingers 61-65, in the embodiment shown in FIGS. 19A-19C, the fingers are replaced with an inflatable bladder 80 which is sealably coupled to the lower end 81 of an axially extending passageway 82 formed in a specimen driver 44, which otherwise is of the same configuration as prior specimen drivers but without the use of the piston-driven fingers 61-65. The source of pressurized air through conduit 43 and passageway 82 allows for the selective pressurization of bladder 80, as shown in FIGS. 19A-19C, which provides both a downward force against the specimen 16 and allows the flexing of the inflated bladder 80 to permit the specimen to move laterally and hold a specimen against the grinding surface 92 while minimizing any tipping forces that otherwise may be present. Thus, in the embodiment shown in FIGS. 19A-19C, the retractable fingers are eliminated but the specimen driver 44 is raised and lowered as in prior embodiments with the bladder 80 providing the necessary movement and downward force and permitting lateral movement of the specimen during grinding. The driver head 44 includes apertures and bladders aligned with each of the specimens held by specimen holder 30 so that the multiple specimens 16 are simultaneously subjected to the downward force and lateral movement.

In each of these embodiments, the fingers 60-65 themselves move laterally or their contact with the specimen allows the specimens 16 to move laterally within the apertures 38 of the specimen holder 30 to minimize the tipping forces on the specimens. In FIGS. 19A-19C, the fingers can be eliminated and replaced with inflatable bladders directly coupled to the specimen driver.

Any one of the embodiments shown in FIGS. 15-19 can be employed with any one of the embodiments of the platens shown in FIGS. 6-14. Likewise, the various platens 24 can be employed with a conventional central force sample holder shown in FIG. 3A to achieve a higher degree of flatness of the ground specimens. The combination of the two elements, i.e., a platen with an outer peripheral rim with surface-oriented reduced height and the lateral movement of the specimens achieves the high degree of flatness obtainable by the grinder 50 of the present invention.

It will become apparent to those skilled in the art that various modifications to the preferred embodiments of the invention as described herein can be made without departing from the spirit or scope of the invention as defined by the appended claims.

The invention claimed is:

1. A metallographic grinder comprising: a base rotatably supporting a platen such that the platen may be rotated about an axis; and a head assembly positioned above said base and including a specimen holder for positioning at least one specimen in contact with said platen, said specimen holder having an opening through which the specimen is supported, wherein said opening is larger than the at least one specimen such that the specimen may move laterally within the opening, wherein said head assembly includes at least one flexible finger for selectively engaging said specimen to apply a force to said specimen against said platen, and wherein said at least one flexible finger can move laterally independent of said head assembly which allows the specimen within said specimen holder to move laterally with respect to said specimen holder during a grinding operation.

2. The apparatus as defined in claim 1 wherein said finger is cylindrical and is mounted in a cylinder with an inner diameter greater than the outer diameter of said finger to allow an end of said finger which engages a specimen to move laterally to allow said specimen to move laterally within said specimen holder during a grinding operation.

3. The apparatus as defined in claim 1 wherein said finger has an end with a Teflon® surface which engages a specimen to allow said specimen to move laterally within said specimen holder during a grinding operation.

4. The apparatus as defined in claim 1 wherein said finger has an end with a spring which engages a specimen to allow said specimen to move laterally within said specimen holder during a grinding operation.

5. The apparatus as defined in claim 4 wherein said spring has a spring constant of about 15 pounds.

6. The apparatus as defined in claim 1 wherein said finger has an end with an inflatable or sealed bellows which engages a specimen to allow said specimen to move laterally within said specimen holder during a grinding operation.

7. The apparatus as defined in claim 1 wherein said finger comprises an inflatable bladder which engages a specimen to allow said specimen to move laterally within said specimen holder during a grinding operation.

8. A metallographic grinder comprising: a base rotatably supporting a platen, said platen having a central area and an outer peripheral rim having an upper surface with a height lower than a height of an upper surface of said central area; and a head assembly positioned above said base and including a specimen holder for positioning at least one specimen in contact with said platen, said specimen holder having at least one opening through which a corresponding one of the at least one specimen is supported, wherein said opening is larger than the corresponding specimen such that the corresponding specimen may move laterally within the opening, wherein said head assembly includes at least one flexible finger corresponding to the at least one opening for selectively engaging the corresponding specimen to apply a force to the corresponding specimen against said platen, and wherein said at least one flexible finger can move laterally independent of said head assembly which allows the corresponding specimen within said specimen holder to move laterally with respect to said specimen holder during a grinding operation.

9. The apparatus as defined in claim 8 wherein said platen has an outer diameter of from about 8 inches to about 12 inches and said peripheral rim has a width of from about 0.5 inch to about 1 inch.

10. The apparatus as defined in claim 8 wherein said rim of said platen is chamfered to lower the height of said rim.

11. The apparatus as defined in claim 10 wherein said chamfer is from about 1.5° to about 6° with respect to the upper surface of said central area.

12. The apparatus as defined in claim 8 wherein the upper surface of said rim is curved downward with respect to the upper surface of said central area.

13. The apparatus as defined in claim 12 wherein the upper surface of said rim is curved downwardly and outwardly over a width of about 5 inches.

14. The apparatus as defined in claim 8 wherein said finger is cylindrical and is mounted in a cylinder with an inner diameter greater than the outer diameter of said finger to allow an end of said finger which engages the specimen to move laterally to allow said specimen to move laterally within said specimen holder during a grinding operation.

15. The apparatus as defined in claim 8 wherein said finger has an end with a Teflon® surface which engages a specimen to allow said specimen to move laterally within said specimen holder during a grinding operation.

16. The apparatus as defined in claim 8 wherein said finger has an end with a spring which engages a specimen to allow said specimen to move laterally within said specimen holder during a grinding operation.

17. The apparatus as defined in claim 16 wherein said spring has a spring constant of about 15 pounds.

18. The apparatus as defined in claim 8 wherein said finger has an end with an inflatable or sealed bellows which engages a specimen to allow said specimen to move laterally within said specimen holder during a grinding operation.

19. The apparatus as defined in claim 8 wherein said finger comprises an inflatable bladder which engages a specimen to allow said specimen to move laterally within said specimen holder during a grinding operation.

* * * * *